A. R. ROBERTSON.
BEARING FOR CENTRIFUGAL MACHINES.
APPLICATION FILED SEPT. 25, 1909.
978,060.
Patented Dec. 6, 1910.
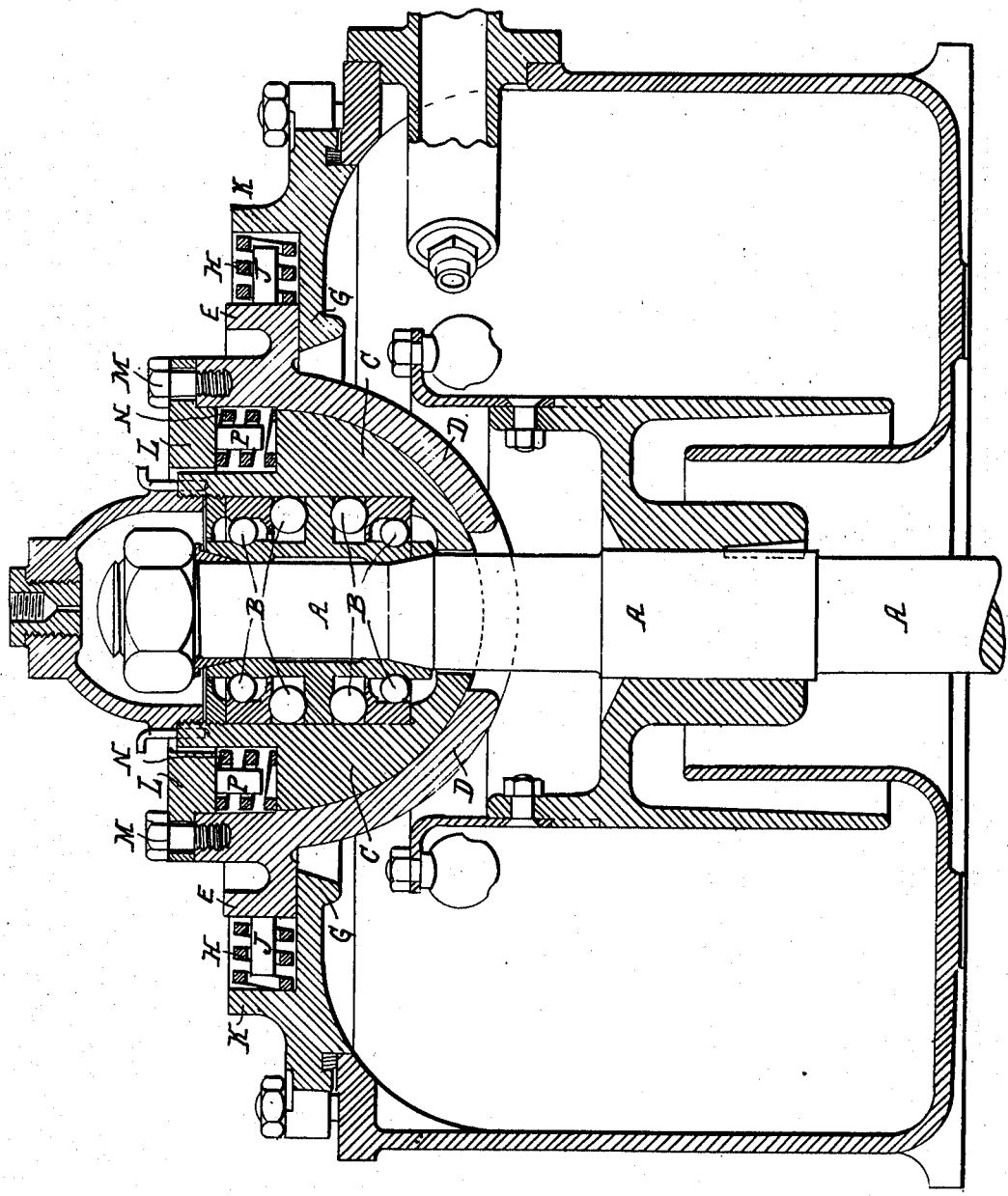

UNITED STATES PATENT OFFICE.

ANDREW ROBERT ROBERTSON, OF GLASGOW, SCOTLAND.

BEARING FOR CENTRIFUGAL MACHINES.

978,060.  Specification of Letters Patent.  Patented Dec. 6, 1910.

Application filed September 25, 1909. Serial No. 519,587.

*To all whom it may concern:*

Be it known that I, ANDREW ROBERT ROBERTSON, a subject of the King of Great Britain and Ireland, and a resident of Glasgow, Scotland, have invented certain new and useful Improvements in Bearings for Centrifugal Machines, of which the following is the specification.

This invention relates to centrifugal machines of the self-balancing type. This class of centrifugal machine is characterized by having the revolving cage or basket so supported that any tendency to oscillation or precession is checked or controlled by an elastic device supporting the bearing, the elasticity of which device at same time permits of any vibration caused by unequal loading of the basket.

The types of elastic support hitherto employed have been limited in form and size by the types of bearings in vogue at the time they were designed. An early and well known form of the bearing hereinbefore referred to is shown in Figure 1 of patent specification No. 592,147 in which the basket is carried by a hollow vertical spindle or shaft which rotates upon a non-rotating shaft within its hollow part. This non-rotating shaft was held within an elastic support which performed the functions described. In order presumably to obtain the same results as are achieved by this present invention, the patentees of Patent No. 592,147 describe in Fig. 3 another bearing in which the top end of the non-rotating spindle is made of hemispherical shape and is supported in a hemispherical cup, thus giving freedom of oscillation to the spindle, but providing no control of such oscillation beyond that insufficiently given by the weight of the rotating parts themselves. The hemispherical cup is given lateral movement which permits of vibration, springs being provided to control this vibration.

In more modern designs, instead of the rotating spindle being hollow it is made solid and rotates in a bearing (usually a ball bearing) which in turn is carried in an elastically supported collar on the spindle. Attempts have been made to apply the principle of Fig. 3 of Patent No. 592,147 to these later forms by making the collar which carries the bearing embracing the rotating spindle hemispherical in either the whole or part of its outer surface and supporting it in a hemispherical cup. This hemispherical collar was acted upon by springs so as to resist its movements when it oscillated, thus controlling oscillation. The fault, however, in these later attempts was that these oscillation controlling devices obtained their purchase from fixed parts of the framing, and therefore did not act to best advantage, being affected in their action by the lateral vibrations of the other parts.

In this present invention, the hemispherical collar which carries the bearing in which the spindle rotates rests in a hemispherical cup shaped seat. The hemispherical cup shaped seat is made with an annular flange flat on its lower surface and resting upon a flat part of the frame, so that it has freedom of lateral movement. The lateral movement allows of vibration alone and is controlled by springs all in known manner, but according to the present invention, between the hemispherical shaped collar part of the bearing resting in the cup shaped seating and that seating, springs are arranged, or they are arranged in such cognate manner that at any rate their effect upon the parts is not modified by the relative lateral movement of them. These springs control the oscillation, but, since they are carried by the seating and so move bodily with it in its lateral movement, they are therefore unaffected by vibration. The two functions of the elastically controlled bearing are therefore performed quite independently one of the other. Instead of metallic springs, rubber or other elastic resilient material may be employed.

In order that the invention and the manner of performing the same may be properly understood, an explanatory sheet of drawings is hereunto appended, showing in vertical section the improved means of support as applied in connection with the spindle of a turbine driven suspended centrifugal machine.

As shown in the drawings, the spindle A rotates as usual in ball bearings B in a collar C, part of the outer surface of which is hemispherical and rests in a hemispherical seat D. This seat D has on its outer surface an annular flange E flat on its lower surface and resting upon an inwardly extending horizontal part G of the framing, so that the seat D has freedom of lateral movement within limits controlled by springs H in known manner, these springs being carried on pins J extending out from the flange E and extending between that flange and an upwardly extending flange K on the horizontal part G of the framing. By this lateral movement vibration is allowed for, and in order to control precession or oscillation, according to the present invention, between the upper surface of the hemispherical part of the collar C resting in the hemispherical seating D and an inwardly projecting ring L secured by screw pins M to the seating, springs N are arranged. These springs are carried on pins P extending down from the ring L, and they control the oscillation, but, since they are carried by the seating D and so move bodily with it in its lateral movement, they are therefore unaffected by vibration. The two functions of the bearing thus elastically supported are therefore performed quite independently one of the other.

What I claim is:—

1. In a centrifugal machine of the type described, a spindle bearing which comprises a collar with hemispherical outer bearing face, a hemispherical seat and a support therefor upon which the same is mounted with limited freedom of lateral movement together with resilient means to control the extent of said movement, in combination with independent resilient means, unaffected by the lateral movement of said seat, for controlling the oscillation of said collar on said seat.

2. In a centrifugal machine of the type described, a spindle bearing comprising a hemispherical seat and a support therefor upon which the same is mounted and means for limiting the lateral freedom of movement of said seat upon its support, a hemispherical spindle collar having a bearing on said seat with limited freedom of oscillation, in combination with resilient means moving freely with said seat but arranged between said collar and seat and limiting the extent of oscillation of said collar in said seat.

3. In a centrifugal machine of the type described, a spindle bearing comprising a hemispherical collar, a hemispherical seat therefor on which said collar has limited freedom of oscillation, in combination with a support for said seat engaged with lost lateral motion by the latter and resilient means interposed between said seat and support for limiting the extent of the lateral motion between said seat and support together with independent means moving freely with said seat and interposed between the latter and the spindle collar whereby the extent of oscillation of said spindle on its seat is limited, substantially as described.

In testimony whereof I have signed my name to this specification, in the presence of two subscribing witnesses.

ANDREW ROBERT ROBERTSON.

Witnesses:
    DAVID FERGUSON,
    WILFRED HUNLY.